(12) United States Patent
Szurkowski et al.

(10) Patent No.: US 6,421,350 B1
(45) Date of Patent: Jul. 16, 2002

(54) DEVICE AND METHOD FOR CONTROLLING THE QUALITY-OF SERVICE IN DATA NETWORKS

(75) Inventors: Edward Stanley Szurkowski, Maplewood; William Philip Weber, Jr., Flemington, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/940,781

(22) Filed: Sep. 30, 1997

(51) Int. Cl.[7] .............. H04J 1/16; H04J 3/14; H04L 1/00; H04L 12/26; H04L 12/28; H04L 12/56
(52) U.S. Cl. ............... 370/419; 370/235; 370/395.21
(58) Field of Search .................. 370/252, 253, 370/352, 353, 355, 356, 410, 522, 524, 229, 231, 230, 232, 233, 234, 235, 236, 523; 209/232, 23.1

(56) References Cited

U.S. PATENT DOCUMENTS

| 5,394,395 A | * | 2/1995 | Nagai et al. | ............ 370/395 |
|---|---|---|---|---|
| 5,400,339 A | | 3/1995 | Sekine et al. | ............ 370/94.2 |
| 5,566,163 A | * | 10/1996 | Petit | ............ 370/230 |
| 5,602,830 A | * | 2/1997 | Fichou et al. | ............ 370/232 |
| 5,640,389 A | * | 6/1997 | Masaki et al. | ............ 370/418 |
| 5,889,779 A | * | 3/1999 | Lincoln | ............ 370/398 |

FOREIGN PATENT DOCUMENTS

| WO | WO 9719535 | 5/1997 | ............ H04J/3/14 |
|---|---|---|---|

* cited by examiner

*Primary Examiner*—Kwang Bin Yao
*Assistant Examiner*—Kevin C. Harper
(74) *Attorney, Agent, or Firm*—Mendelsohn & Associates, PC

(57) ABSTRACT

The present invention provides a network terminating unit configured to receive communication signals associated with a packet telephony system and modify said signals to maintain the quality of service of a data network associated with the packet telephony system at or below a certain level of quality of service independent of the traffic load of the data network.

21 Claims, 2 Drawing Sheets

General Packet Telephony System

DEVICE AND METHOD FOR CONTROLLING THE QUALITY-OF SERVICE IN DATA NETWORKS

BACKGROUND OF THE INVENTION

1. Field of the Invention

The present invention is directed to a device and method for controlling the quality of service a data communication network and more particularly to a network terminating unit for maintaining the quality of service of the data communication network at or below a level independent of network traffic.

2. Description of the Related Art

Communication network operators who provide traditional and enhanced telephony services (e.g., voice calls, FAX, voice mails), typically via the well known Public Switched Telephone Network (PSTN), are increasingly using data networks to convey their communication signals. One particular well known and popular data network is commonly referred to as the Internet. A data communication network is a communication network in which communication signals are conveyed by communication devices ( e.g., wireline telephones, wireless telephones, computers, modems, facsimile machines, video transmitters and receivers, terminal adapters) throughout the network in digital form.

The communication signals associated with a data communication network (or any other communication network) are conveyed in accordance with a protocol. The protocol represents a particular set of rules by which all or some of the communication devices within a data network (and other types of communication networks) initiate communication, convey information and terminate communication. Thus, all or some of the communication devices which are part of a data communication network should transmit and receive communication signals in accordance with a protocol. In many data networks, these communications signals, which represent some type of information (e.g., digital data, digitized voice, digitized video, facsimile data, protocol information) are structured as packets. Packets typically consist of header and/or trailer bits plus the user data to be conveyed. The header and/or trailer bits on each packet contains information required by data network protocols, such as source and destination addresses, control information, error checking and/or correction bits etc. The user information in a packet is often called its payload. Packets are transmitted through a packet network using a well known technique called packet switching.

There are many types of packet networks, including variations known as frame or cell networks, e.g., frame relay networks, Asynchronous Transfer Mode (ATM) networks etc. The term packet network refers to all types of data communication networks that transmit, receive, switch and otherwise process information between endpoints as discrete units, i.e., packets, frames, cells, etc.

In a packet switching data network, each packet is routed from point to point within the data communication network. The path taken by one packet representing part of a communication signal can be different from the path taken by other packets of that same communication signal. Thus, information can be represented by a communication signal which comprises at least one packet. One particular type of communication system which uses a data network to convey its communication signals is known as Packet Telephony.

Packet Telephony is the integration of speech compression and data networking technologies to provide traditional and enhanced telephony services over packet switched data networks rather than the PSTN or some other telephony system. Thus a packet telephony system comprises at least one underlying data network through which communication signals associated with the packet telephony system are conveyed. For example, if two users of the PSTN (Person A and Person B) are having a telephone conversation, the analog speech signals from A's microphone are digitized by an A/D converter, typically at 8000 samples/second, 8 bits/sample, totaling 64 Kbits/second. The digital speech samples are then compressed to reduce the number of bits needed to represent them. The compression ratio is typically in the range of 8:1 to 10:1 yielding a bit rate in the range of 6400 bits/second to 8000 bits/sec. The compressor's output is then formed into packets which are transmitted through a packet switched data communication network to the packet telephony system serving person B. When the packets are received by Person B's system, the packets are de-packetized, i.e., the header and trailer bits are removed, and the remaining compressed information bits (i.e., compressed digitized voice) are sent to a decompressor. The decompressor output is connected to a D/A converter which drives Person B's speaker. For a typical 2-party telephone call, packet telephony terminating equipment at each end simultaneously implement both the transmit and the receive functions.

FIG. 1 shows an exemplary configuration of a packet telephony communication system. For the sake of clarity, only two telephones (100, 116) are shown connected to an underlying data network 108 via packet telephony terminating equipment 104 and 112. In an actual packet telephony communication system there may be hundreds or even thousands of telephones and other communication devices connected to data communication network 108 via packet telephony terminating equipment (e.g., 104, 112). Also, an actual packet telephony communication system may use more than one data communication network to convey its communication signals.

Still referring to FIG. 1, telephones (100, 116) are connected to packet telephony terminating equipment (104, 112) via communication links 102 and 114. Communication links 102 and 114 as well as 106 and 110 can be any medium (e.g., twisted wire pairs, coaxial cables, fiber optic cables, air) through which communication signals are typically conveyed. Packet Telephony terminating equipment 104 and 112, which can be implemented with well known standard communication equipment such as gateways and routers, accept standard analog or constant bit rate digital voice signals (and other signals), encode these signals using voice compression techniques, and create packets from the resulting bit stream. The packets are forwarded to data communication network 108 which routes them to other packet telephony terminating equipment that extract the information bits from the packets, decompress the information bits, convert said bits to analog signals which are then sent to the telephone handsets (e.g., 100, 116) or other communication devices. Thus, for a 2-party packet telephone call as depicted in FIG. 1, the Packet Telephony network terminating equipment (104, 112) at each end of the call are simultaneously compressing, packetizing, decompressing and de-packetizing voice signals and other types of communication signals conveyed in a packet telephony system. A packet telephony call is defined as a telephone call between at least two users of a packet telephony system whereby the call is made in accordance with the protocols being followed by the packet telephony system; the packet telephony call includes voice calls, facsimile communications, voice mails and other services.

Prior to the use of packet switching in communication networks, many communication networks used a different scheme known as circuit switching. In contrast to packet switching, circuit switching allocates network resources to define a specific communication path or channel through which communication signals are to be conveyed between two points within the network. Circuit switching is widely employed in the design of telephony systems such as the well known POTS (Plain Old Telephone Service) networks or the PSTN in which a particular communication path, or channel or circuit is allocated specifically for particular users who wish to communicate with each other. Because of the manner in which circuit switching networks allocate their resources, circuit switched networks, such as the PSTN, are generally viewed as inefficient relative to packet switching networks particularly for sporadic or bursty communications.

Unlike circuit switched networks, data communication networks which use a packet switching scheme do not typically reserve resources for each active user; this increases the utilization efficiency of the data communication network infrastructure with bursty traffic, but makes the end-to-end performance highly dependent on the (usually uncontrollable) traffic patterns of all the users of the data communication network.

The quality of service provided by a packet telephony system (as perceived by users or operators of the packet telephony system) depends on the values of several well known network parameters of the underlying data communication network such as packet loss, bit errors, delay, delay variation (often called jitter) that affect the quality of a packet telephony call. As such, many data communication networks are capable of varying levels of quality of service. When packet telephony calls are conveyed over data communication networks together with varying data traffic, the quality of the calls suffers from breakups, dropouts or other unacceptable interruptions in the conversations as the parameter values vary outside acceptable ranges. Data communication networks can be engineered to provide acceptable (as defined by the users and/or network operators) quality of service for packet telephony calls under worst case loading situations. Such a design approach may, for example, be used for a packet telephony system that is intended to approximate the quality of service of the PSTN.

The quality of service of a communication system including a packet telephony system is defined by a set of values for one or more of the network parameters. For example, a network operator can define an acceptable quality of service for a particular packet telephony system as having a bit error rate of 10% averaged over any one second interval; a packet loss rate of 1 packet for every 10,000 packets transmitted and a propagation delay of 25 msec for any packet. Each parameter can also be characterized by a range of values. For example, an acceptable packet loss rate can be 1–5 packets loss for every 10,000 packets transmitted, an acceptable packet propagation delay can be 25–30 msec. Thus, for the last example, a packet loss rate of 1 or 2 or 3 or 4 packets is acceptable. The acceptable quality of service for another network may be defined by more or less network parameters or even only one network parameter. The set of network parameters and their values (or range of values) used to define an acceptable quality of service for any particular communication system (including a packet telephony system) can be devised by a network operator, the users of the system or both entities.

It is desirable for many network operators to use packet telephony systems to provide 'off-brand' or 'second tier' services defined as services whose quality and price are both lower than the PSTN; these operators may not wish to cannibalize their traditional profitable PSTN services by offering a new service with comparable quality but lower prices. The second tier or off-brand services should, of course, perform at acceptable levels, i.e., provide acceptable quality of service as defined by the network operators and/or users. However, given the difficulty of controlling the end-to-end quality of packet telephony calls due to the effects of unpredictable traffic loading within the underlying data communication network (i.e., network loading), operators are concerned that the quality of service of these second tier offerings can be quite acceptable (to users and/or network operators) during periods of low network load, and degrade to the expected lower quality levels as the loading increases. Alternatively, if the packet telephony system were engineered to provide the desired less-than-PSTN quality of service during periods of light traffic, heavy loading is likely to make the service totally unusable. The network load can be defined as the amount of users' traffic that is being conveyed through a packet telephony system at any one time. The network load can also be defined as the percentage of the resources contained within the packet telephony system which are being used at any one time. The network load, thus, should reflect the capacity of the packet telephony system that is available to potential connected users. The variation in the quality of packet phone calls with network loading produces random changes in the performance of the packet telephony system as perceived by the subscribers (or network operators), leading to customer complaints and mismanaged user and operator expectations.

Therefore, there is a need for network operators to provide a packet telephony system that has an acceptable quality of service and which is independent of network loading. There is the further need for network operators to maintain the quality of service of the packet telephony system at a level that is below the quality of service of a traditional telephony system (e.g., PSTN) independent of the network load. There is yet a further need for network operators to provide a packet telephony system whereby the parameters of the underlying data networks can be maintained at certain values or range of values independent of network loading.

SUMMARY OF THE INVENTION

The present inventions provides a network terminating unit configured to receive communication signals associated with a data communication network capable of varying levels of quality of service. The network terminating unit comprises at least one module which can modify the received communication signals so as to keep the quality of service of the data communication network at or below a threshold level independent of network loading.

BRIEF DESCRIPTION OF THE DRAWINGS

These and other features are delineated in detail in the following description. In the drawing.

DETAILED DESCRIPTION

Figure 1:
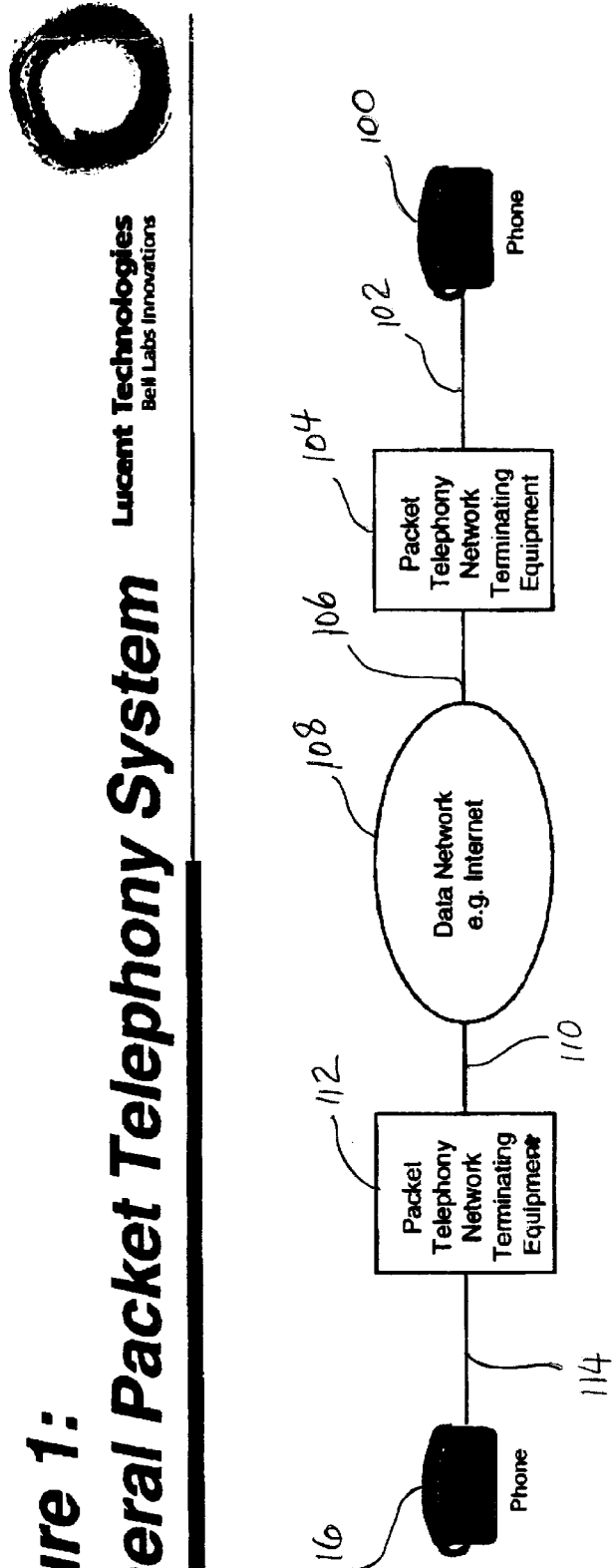
FIG. 1 shows an exemplary configuration of a packet telephony system.
Figure 2:
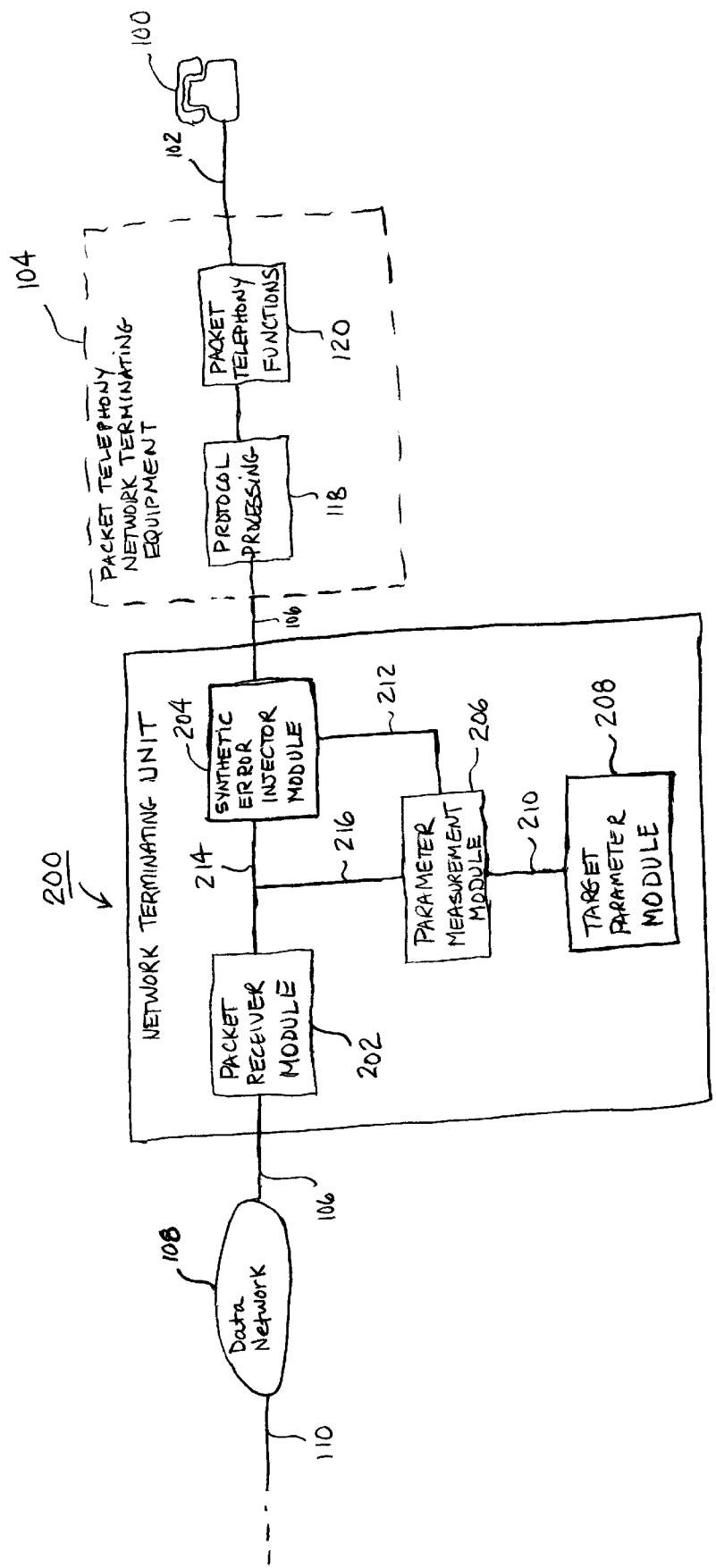
FIG. 2 depicts a Network Terminating Unit of the present invention at one end of a packet telephony system such as the one depicted in FIG. 1.

Referring now to the drawings in which like reference numerals identify similar or identical elements, FIG. 2 depicts an embodiment of the present invention (Network Terminating Unit 200) connected to underlying data communication network 108 and Packet Telephony Network terminating equipment 104 via communication link 106 and thus forms part of one end of a packet telephony system.

Network Terminating Module 200 is configured to modify communication signals associated with data communication network 108 capable of varying levels of quality of service such that the quality of service of data communication network 108 is maintained at or below a threshold level independent of network loading. The level of the quality of service of data communication network 108 is defined by and is thus a function of at least one measured network parameter value or a set of values of various network parameters identified by the network operator or the users or both. The quality of service level can be quantitatively defined by any scheme devised by the network operator or users or both such that it is represented by at least one number or a range of numbers. The network operator or users or both can arbitrarily or purposefully set a threshold level of quality of service for a packet telephony system. Whenever the quality of service level (derived from measured parameter values) is above the threshold level set by the network operator or users or both, the present invention, i.e., network terminating unit 200, modifies the received communication signals such that the measured level of the quality of service is maintained at or below the threshold level; this is done independently of network loading. Thus, for example, when the network load is light, certain network parameters may fall outside acceptable range of values, making the measured level of the quality of service rise above the threshold level. In such a case, network terminating unit 200 will modify the received communication signals such that the measured level is at or below the threshold level. When the threshold level set by the network provider and/or users correspond to a quality of service that is less than the traditional telephony systems (e.g., PSTN), the packet telephony system associated with data communication network 108 can thus be characterized as a second tier or off brand telephony system.

Communication signals (e.g., packets) enter data communication network 108 via communication link 110 from other packet telephony equipment (not shown). The received communication signals are routed through data network 108 in accordance with a particular packet switching scheme and are received by Network Terminating Unit 200 via communication link 106. The packets are first received by packet receiver module 202 which extracts certain fields or portions of the header and/or trailer depending on the way certain parameters are measured. Packet receiver 202 transfers the packet payloads to synthetic error injector module 204 and parameter measurement module 206 via paths 214 and 216 respectively. In many data communication networks, data required for the measurement data of various network parameters may be located in the header and/or trailer portion of the packets. In such cases, packet receiver module 202 can be configured to transfer the incoming measurement data to parameter measurement module to 206.

Parameter measurement module 206 is configured to examine the packet payloads and determine the instantaneous values of various parameters (e.g., packet loss rate, packet delay, jitter) associated with each packet payload. Parameter measurement module 206 may also maintain measures of certain parameters over longer time periods, for example, averaging the packet loss rate over some time period. Parameter measurement module 206 is further configured to compare the measured parameter values against their desired values stored in target parameter value module 208. Parameter measurement module 206 is able to compare the measured parameter values with the desired values by retrieving the desired values from Target Parameter value module 208 via path 210. The desired parameter values stored in module 208 are typically set by the network operator (or users) and can be used to derive the threshold level for the packet telephony system. Parameter measurement module 206 generates control signals based on the result of its comparison of the measured parameter values with the desired parameter values. The control signals are transmitted to error injector module 204 via path 212 and instruct module 204 as to how to modify the received packets such that the quality of service level of data communication network 108 is maintained at or below the threshold level independent of network loading (i.e., traffic load of data communication network 108).

Synthetic error injector module 204 modifies the received packet payloads by adding appropriate errors to a stream of packets payloads in accordance with the control signals from parameter measurement unit 206. The errors simulate the effect of the parameters on data communication network 108 and can be implemented by various well known techniques. For example, the packet loss rate, can be raised by randomly discarding packets at a specified rate. Network delay and jitter can be realized by randomly delaying received packets before delivering them to Packet Telephony Network Terminating Equipment 104. There will be instances where certain received packets have parameters which are already at or within acceptable values. In such instances, the control signals generated by parameter measurement module 206 will accordingly instruct synthetic error injector module 204 not to modify the packet stream.

Still referring to FIG. 2, network terminating module 200 monitors measured network parameters by comparing each packet received by packet receiver unit 202 and allowing error injector module 204 to modify, if necessary, said received packets in accordance with the control signals generated by parameter measurement module 206. The monitoring of measured network parameters can be done on a continuous basis, a periodic basis or aperiodic basis. The network parameters can be measured by parameter measurement module 206 with the use of well known packet error measurement techniques. For example, parameters such as packet loss, packet delay and packet delay variation jitter) can be measured with the use of packet sequence numbering and time stamping. Packet sequence numbering and time stamping are well known techniques whereby each packet is labeled with a time value (e.g., actual time of day) and a sequence number prior to being routed through data communication network 108 and the period of time it takes for the labeled packet to reach its destination is measured. The label can be represented by a group of bits stored in the header or trailer portion of the packet. Also, typically data communication networks (and other communication networks) contain various monitoring equipment (not shown) located throughout the network that measure network parameters and make such data available to other equipment of the network. Thus, parameter measurement module 206 can make use of such data (which can be stored within the header or trailer portions of the packets) to generate the appropriate control signals to synthetic error injector module 204.

After the packet payloads have been modified by synthetic error injector module 204, they are transferred via communication link 106 to packet telephony terminating equipment 104 for protocol processing (module 118) and packet telephony processing (eg., decompression and D/A conversion performed by module 120). The output of module 104 is transferred to user 100 via communication link 102.

As such, the present invention can be used to maintain the quality of packet telephony calls at or below a network operator or user defined threshold level of quality of service that is less than the level of quality of service of traditional telephony systems such as the PSTN. The packet telephone calls are dependent upon one or several network parameters and thus have varying levels of quality of service.

For example, in a packet telephony system whose quality of service is a function of the following network parameter range of values stored in module 208:

(a) Packet loss rate=25–100 packets lost for every 10,000 packets;
(b) Packet propagation delay=100–200 msec;
(c) Bit Error=15–17% averaged over any 1 sec. interval;
(d) Packet Delay variation (Jitter)=50–100 msec.

the quality of service level can rise above the threshold level defined by these values if, say, the measured packet loss rate is 1 packet lost for every 10,000 packets transmitted, the measured packet propagation delay is 25 msec, the bit error rate is 12% over any 1 sec. interval and the jitter is 2 msec. The threshold level is selected such that it represents a quality of service that is less than that of the PSTN or some other traditional telephony system.

Without any regard to the traffic load (network loading) of data network 108, synthetic error injector module 204 may receive control signals from parameter measurement module 206 instructing module 204 to discard at least 2 packets for every 10,000 packets received, add at least 10 msec to the measured propagation delay, contaminate incoming payloads to increase the bit error to at least 15% over any 1 sec. interval and add at least 2 msec of jitter to the received payloads. The severity of the injected synthetic errors is continuously varied in response to the measurements of the network parameters as compared with the stored target values.

Various methodologies can be created to determine when the level of quality of service of a packet telephone call has risen above a defined threshold level. One methodology that can be devised (by the network operator and/or users), for example, is that when all four of the measured network parameter values fall within the stored target values, parameter measurement module 206 will accordingly generate control signals instructing synthetic error injector module 204 to stop adding errors. Another methodology can be when a significant percentage (e.g., 3 out of 4) of the target values have been reached the parameter measurement module 206 can be designed to instruct module 204 to stop adding errors. It is readily obvious to one of ordinary skill in the art to which this invention belongs that other appropriate methodologies can be devised and implemented. The particular methodology used depends on the particular network operator and/or users.

It should be noted that modules 202, 204, 206 and 208 of the present invention can be implemented with software, firmware, hardware or a combination thereof. The modules of the present invention need not be co-located, these modules can be located within various equipment throughout the data communication network and the telephony system. Paths 210, 212, 214 and 216 can be wires, communication links or any well known implementations of connecting paths used in electronic or electrical circuits. Depending on the particular implementations of the modules, the data, information and control signals conveyed between the modules can be represented as digital signals, analog signals, optical signals, contents or memory locations in memory circuits, contents of registers that are part of firmware or software programs.

Further, one of ordinary skill in the art to which this invention belongs will readily understand that the present invention (i.e., network terminating unit 200) can be located anywhere in data communication network 108 or integrated into packet telephony network terminating equipment 104 or even user equipment 100.

We claim:

1. A network terminating unit comprising:
    at least one module configured to receive communication signals associated with a data communication network capable of varying levels of quality of service, the at least one module being further configured to contaminate the communication signals based on network parameter values determined from information extracted from the received communication signals thus maintaining the quality of service of the data communication network at or below a defined threshold independent of network loading, wherein:
    the communication signals comprise packets having header and payload portions;
    the network parameter values comprise a bit error rate; and
    the contamination includes contaminating the payload portion of at least one packet.

2. The network terminating unit of claim 1 where the at least one module is a synthetic error injector module configured to receive the packet payloads and contaminate such payloads.

3. The network terminating unit of claim 2 further comprising a packet receiver module coupled to the synthetic error injector module and to a parameter measurement module where the packet receiver module is configured to receive the packets, extract the packet payloads and transfer such payloads to the parameter measurement module and the synthetic error injector module allowing the parameter measurement module to determine measured network parameter values and to generate control signals that are transmitted to the synthetic error injector module instructing the synthetic error injector module on how to contaminate the received packet payloads.

4. The network terminating unit of claim 3 further comprising a target parameter module coupled to the parameter measurement module where the target parameter module contains network parameter values that the parameter measurement module accesses and compares with the received measured network parameter values and generates the control signals based on such a comparison.

5. The network terminating unit of claim 3 where the synthetic error injector module contaminates the received packet payloads by adding appropriate errors to the packet payloads in accordance with the control signals generated by the parameter measurement module.

6. The network terminating unit of claim 3 where the target parameter module contains desired network parameter values that are used to derive the threshold level.

7. The network terminating unit of claim 3 where the synthetic error injector module contaminates the payloads of received packets such that network parameters comprising two or more of bit error rate, packet loss rate, packet propagation delay and packet jitter are modified.

8. The network terminating unit of claim 1 where the at least one module is configured to contaminate the communication signals such that packet loss rate is modified.

9. A method for maintaining a data communication network at or below a defined threshold level of quality of service independent of network loading, the method comprising the steps of:

receiving communication signals from the data communication network capable of varying levels of service;

determining network parameter values based on information extracted from the received communication signals; and contaminating the communication signals based on the network parameter values so as to maintain the quality of service of the data communication network at or below the defined threshold independent of network loading, wherein:

the communication signals comprise packets having header and payload portions;

the network parameter values comprise a bit error rate; and the step of contaminating comprises the step of contaminating the payload portion of at least one packet.

10. The method of claim 9 where the step of receiving communication signals comprises the step of extracting network parameter values from the received communication signals.

11. The method of claim 9 where the step of determining network parameter values further comprises the steps of:

retrieving stored network parameter values;

comparing the retrieved network parameter values with the determined values; and generating control signals based on the comparison where the control signals dictate how the received communication signals are to be contaminated.

12. The method of claim 9 where the payload portions of the received packets are contaminated by adding errors of various severity to such packet payloads.

13. The method of claim 12 where the severity of added errors is continuously varied in response to comparisons of network parameter value measurements with stored target values.

14. The method of claim 9 where the step of contaminating further comprises the step of discarding one or more packets.

15. The method of claim 9 where the step of contaminating further comprises the step of delaying the received packets before delivering them to terminating equipment.

16. The method of claim 9 where the communication signals are contaminated such that packet loss rate is modified.

17. A network terminating unit comprising:

a synthetic error injector module configured to:

receive communication signals associated with a data communication network capable of varying levels of quality of service;

contaminate the communication signals based on network parameter values determined from the received communication signals thus maintaining the quality of service of the data communication network at or below a defined threshold independent of network loading;

the communication signals are packets comprising header and payload portions; and the synthetic error injector module is configured to receive the packet payloads and contaminate such payloads;

a packet receiver module coupled to the synthetic error injector module and to a parameter measurement module where the packet receiver module is configured to receive the packets, extract the packet payloads, and transfer such payloads to the parameter measurement module and the synthetic error injector module allowing the parameter measurement module to determine measured network parameter values and to generate control signals that are transmitted to the synthetic error injector module instructing the synthetic error injector module on how to contaminate the received packet payloads.

18. The network terminating unit of claim 17 further comprising a target parameter module coupled to the parameter measurement module where the target parameter module contains network parameter values that the parameter measurement module accesses and compares with the received measured network parameter values and generates the control signals based on such a comparison.

19. The network terminating unit of claim 17 where the synthetic error injector module contaminates the received packet payloads by adding appropriate errors to the packet payloads in accordance with the control signals generated by the parameter measurement module.

20. The network terminating unit of claim 17 where the target parameter module contains desired network parameter values that are used to derive the threshold level.

21. The network terminating unit of claim 17 where the synthetic error injector module contaminates the payloads of received packets such that network parameters comprising one or more of bit error rate, packet loss rate, packet propagation delay and packet jitter are modified.

* * * * *